United States Patent [19]

Ginns

[11] 3,877,300
[45] Apr. 15, 1975

[54] MEASUREMENT OF PARAMETERS ON A ROTATING MEMBER

[75] Inventor: Haskell Ginns, Belmont, Mass.

[73] Assignee: The Indikon Company, Inc., Watertown, Mass.

[22] Filed: Feb. 25, 1974

[21] Appl. No.: 445,150

Related U.S. Application Data

[63] Continuation-in-part of Ser. No. 222,267, Jan. 31, 1972, Pat. No. 3,797,305.

[52] U.S. Cl. .............................. 73/136 A; 73/1 R
[51] Int. Cl. .............................................. G01l 3/10
[58] Field of Search .......... 73/1 F, 1 R, 1 C, 136 A, 73/351; 324/130, DIG. 1

[56] References Cited
UNITED STATES PATENTS

| | | | |
|---|---|---|---|
| 2,602,839 | 7/1952 | Ellis | 73/1 R X |
| 3,130,578 | 4/1964 | Ames, Jr. | 73/1 R X |
| 3,134,279 | 5/1964 | Sims et al. | 73/136 A X |
| 3,268,880 | 8/1966 | Miller | 73/351 X |
| 3,399,398 | 8/1968 | Becker et al. | 324/DIG. 1 |
| 3,439,258 | 4/1969 | Van Leeuwen | 324/74 X |
| 3,450,978 | 6/1969 | Norman | 324/DIG. 1 |

Primary Examiner—Charles A. Ruehl
Attorney, Agent, or Firm—Weingarten, Maxham & Schurgin

[57] ABSTRACT

Instrumentation particularly for measuring torque on a rotating shaft. The instrumentation includes an excitation source external of the shaft providing an output excitation signal with periodic electrical markers. The excitation signal with the electrical markers is coupled to shaft mounted electronics for energizing a strain gage bridge. An electronic switch mechanism is responsive to the periodic electrical markers in the excitation signal for alternately biasing and unbiasing the strain gage bridge to provide portions of torque representing output signal and torque plus reference representing output signal. The output signal is chopped at a second frequency and coupled back to instrumentation external of the shaft along with a signal representative of the phase of the chopping signal. The chopped output signal is synchronously detected and separated onto first and second paths in accordance with the amplitude of the detected signal which respectively represent strain gage torque and reference. The ratio of the first signal to the difference between these signals is indicated to represent the shaft torque compensated for variations in circuit performance and coupling efficiencies.

32 Claims, 4 Drawing Figures

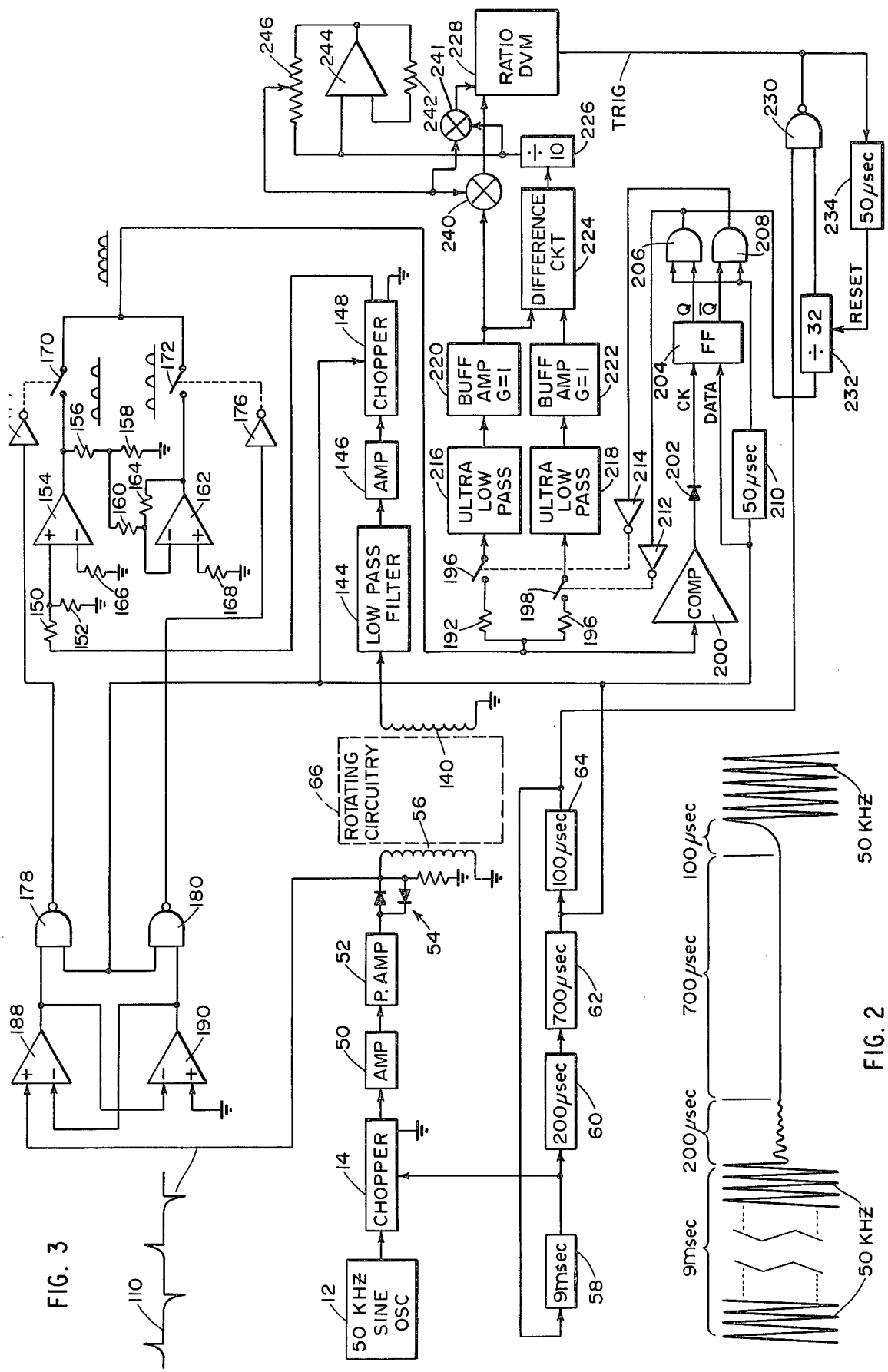

MEASUREMENT OF PARAMETERS ON A ROTATING MEMBER

CROSS-REFERENCE TO RELATED APPLICATION

This application is a continuation-in-part of copending U.S. patent application Ser. No. 222,267, filed Jan. 31, 1972, now U.S. Pat. No. 3,797,305.

FIELD OF THE INVENTION

The present invention relates to instrumentation for measuring a parameter on a relatively moving element and in particular to measuring a parameter on a rotating shaft.

BACKGROUND OF THE INVENTION

One of the most commonly found elements in mechanical power transmission systems, particularly for high power application, is the rotating shaft. With the increasing concern for the availability of energy, there is an increasing need to improve the efficiency of particularly high power mechanical energy transmission systems. A vital parameter for measuring efficiency in a rotary system is the horse power transmitted by a shaft and available for use at the power utilization end of the system. The horse power transmitted is a function of the shaft rotational speed multiplied by the shaft torque. Traditionally, measurement of shaft rotational speed presents no difficulties, whereas the measurement of shaft torque, necessitating the transmission of power to the rotation shaft and the return transmission of a torque representing signal from the shaft to outside instrumentation has been subject to electronic errors from instrumentation located on the shaft as well as variations in coupling efficiency in the systems coupling power into and signal out from the shaft.

In my above-referenced U.S. patent application Ser. No. 222,267, filed Jan 31, 1972 now U.S. Pat. No. 3,797,805, of which the present application is a continuation-in-part and which is incorporated herein by reference, a system is described and claimed which permits measurement of the torque in a rotating element in which the torque indication is compensated for these circuit errors and coupling efficiencies. The present invention represents an improved concept for achieving an error free torque representation.

BRIEF SUMMARY OF THE INVENTION

The features of the present invention, in a preferred embodiment, include a system for indicating the torque on a rotating shaft including instrumentation both on and off the shaft. A single frequency of power excitation is applied to the shaft from external points through a rotary transformer and used to power a strain gage bridge from which an output signal is taken representative of shaft torque magnitude and polarity. Electrical markers consisting of periods of no signal are provided at periodic intervals in the power coupled to the shaft, and the markers are used to sequentially bias and unbias the sensor bridge so that the output signal reflects both a torque and a predetermined reference signal. The sensor signal is chopped and coupled through a rotary transformer to instrumentation external of the rotating shaft. An additional set of electrical markers, phased with the chopping signal, are also coupled from the rotating shaft to external instrumentation to provide phase synchronous demodulation of the chopped sensor signal into an output signal representative of sensor amplitude and sign. The resulting signal is applied along separate paths in accordance with the respective torque and reference amplitudes. The signals on the two paths are differenced and the ratio of the first path signal to the difference signal is indicated in order to represent shaft torque free of errors resulting from circuit inaccuracies or variations, as well as variations in coupling through the rotary transformer.

System timing identifies the periods of no signal as the times during which the sensed torque or reference signals may be measured after coupling from the shaft. The phase-locked synchronous detection permits measurement of torque of either polarity, and permits external compensation for inevitable sensor zero offsets at zero torque points.

BRIEF DESCRIPTION OF THE DRAWINGS

These and other features of the present invention are more fully described below in a detailed description of the preferred embodiment presented for purposes of illustration and not by way of limitation, and the accompanying drawings of which:

FIG. 2 is a waveform diagram illustrating the time sequence of signals employed in the present invention;

FIG. 3 is a detailed circuit diagram of circuitry according to the present invention located in a stationary condition.

DETAILED DESCRIPTION OF THE PREFERRED EMBODIMENT

Figure 1:
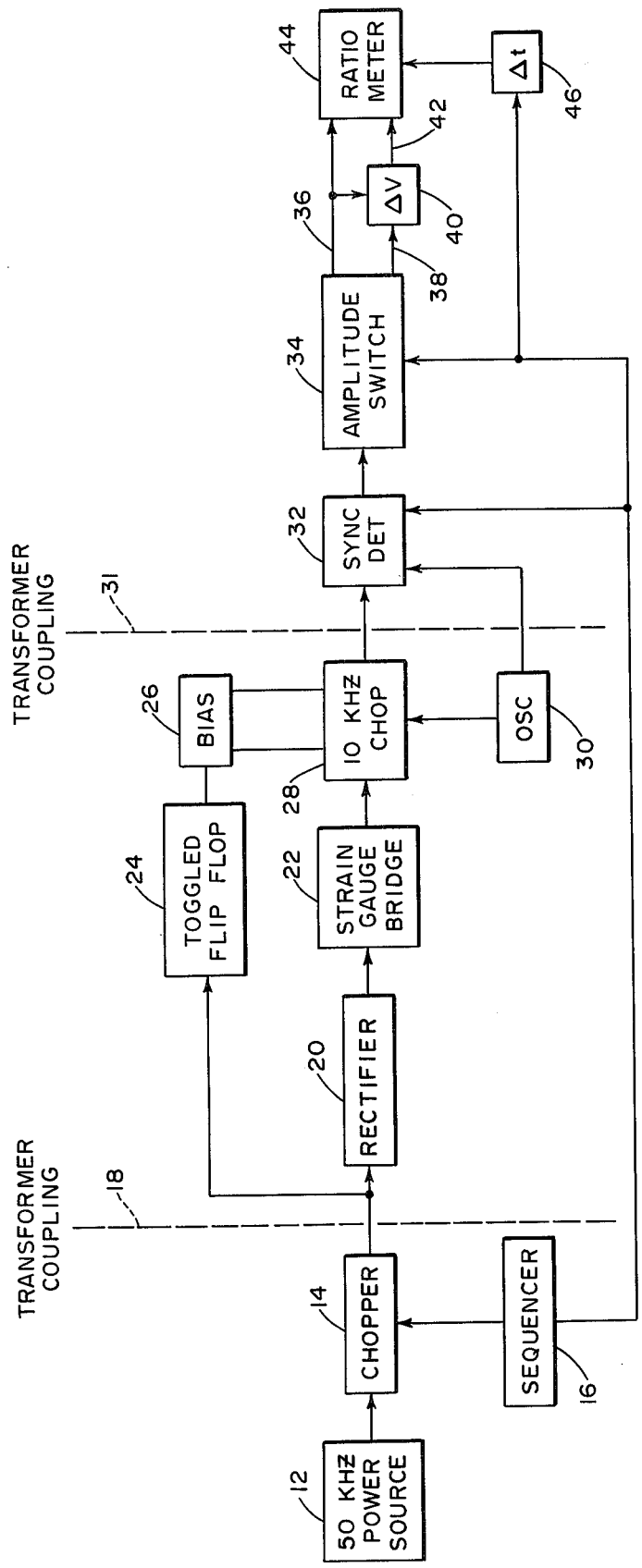
FIG. 1 is a general system block diagram of an instrumentation system for measuring a parameter on a relatively moving element in accordance with the present invention.

The present invention contemplates an improved circuit concept for measuring a parameter on a relatively moving element with compensation for coupling and circuit errors. While of particular utility in a system for measuring torque on a rotating shaft, it is to be understood that the concept of the present invention may be more broadly applied.

In understanding the structure and operation of the preferred embodiment of the present invention, a brief description of system functions with respect to a system block diagram in FIG. 1 will first be described. External of a relatively moving element, a 50 KHz sinewave power source 12 is provided which may typically include a higher frequency oscillator, frequency divider and sine-shaping network. The 50 KHz signal from power source 12 is applied to a chopper circuit 14 which responds to periodic signals from a sequencer system 16 in order to remove periodic sections from the 50 KHz signal. In the preferred embodiment, as shown in FIG. 2, the chopping function will provide a repeating sequence of 9 milliseconds of 50 KHz power signal followed by 1 millisecond dead time of no signal which, as shown in FIG. 2 and will be described below, is composed of 200 microsecond, 700 microsecond and 100 microsecond segments. The signal of FIG. 2 is applied to utilization circuitry associated with the relatively moving element, preferably through a rotary transformer coupling 18. The signal on the shaft is applied to a rectifier and filter system 20 which provides a generally DC signal for application to diagonally opposite points of a strain gage bridge 22. This power signal coupled from the chopper circuit 14 is applied to a toggled flip-flop system which responds to the 1 millisecond dead time in each cycle of the excitation applied through the rotary transformer to toggle its states. The output of flip-flop system 24 controls a bias system 26 which is operative in a first state of the flip-flop system 24 to open circuit a shunt across one leg of the strain gage bridge 22, and in the second state of the flip-flop system 24 to close the circuit thereby connecting a shunt across one leg of the strain gage bridge 22 to increase its output signal, typically by a factor of 10, above the full scale torque signal for the strain gage bridge 22. Accordingly, the strain gage bridge 22 will provide a DC output signal which for one cycle of the FIG. 2 signal sequence represents torque on the shaft, and for the subsequent cycle represents torque plus the substantially higher amplitude reference signal contributed by the shunt across one bridge leg. The entire sequence of alternating torque and torque plus reference signals will repeat indefinitely. These DC signals from the strain gage bridge 22 are chopped at 10 KHz by a chopper 28 for which a 10 KHz signal is supplied by an oscillator 30. The output of the modulator 28 is coupled through a further rotary transformer 31 to a point external of the relatively moving element 32. The 10 KHz reference signal for synchronous detection is provided from the oscillator 30 as a sequence of pulses, phased to the oscillations of the oscillator, and coupled through one of the windings on the rotary transformer to the synchronous detector 32. The synchronous detector 32 is enabled by a signal from sequencer 16 to provide an output only during the 700 microsecond interval illustrated in FIG. 2. This interval is selected as a period during which noise contributed by the higher amplitude excitation signal from power source 12 is absent throughout this system and accordingly represents a quiet period for sensing the torque and reference signals. The output of the detector 32 represents the amplitude of the torque or torque plus reference signal, as well as the polarity, and within the range of operation is a linear DC signal.

The output of the detector 32 is applied to an amplitude switch 34 which is also activated during the 700 microsecond period of FIG. 2 to direct the signal detector 32 along first or second output paths 36 and 38, depending upon the amplitude of the signal applied thereto. Since the amplitude of the torque plus reference signal is substantially greater, typically at least by a factor of 10, than the torque signal, and is itself relatively more constant, the amplitude switch 34 can reliably distinguish between the torque plus reference signal and all other signals so as to appropriately direct its input along the respective paths 36 and 38. The signals along the two paths 36 and 38 are applied to a differencing circuit 40 which provides as an output the reference signal alone. The reference signal on a line 42 along with the torque signal on line 36 are applied to a ratio meter 44, which indicates the ratio of the two inputs. The ratio meter 44 is triggered to respond to the signals on lines 36 and 42 for a short period after the 700 microsecond interval by a time delay circuit 46.

Because the meter 44 indicates the ratio of the torque and reference signals, and because any errors in the FIG. 1 circuitry or inefficiencies in transformer coupling and variations therein will appear equally in the reference and torque signals, the ratio indication effectively cancels them out to provide an accurate torque indication, as a percentage of full scale torque, a known parameter. The actual torque can thereby be determined by a simple scale factor adjustment in the reading of the ratio meter 44. In order to compensate for the fact that the strain gage bridge zero output may not correspond exactly to shaft zero torque, a constant offset signal may be applied to the torque and reference signals as is described below.

In FIG. 3, the details of the stationary circuitry are shown to comprise the 50 KHz sinewave oscillator 12 and chopper 14. Chopper 14 typically includes a voltage controlled switch such as an FET which periodically grounds the output signal applied to an amplifier 50 and power amplifier 52. The output of the power amplifier 52 is applied through a full wave series diode network 54 to a coil 56, of a rotary transformer. The chopper 14 derives its 1 millisecond signal for grounding the signal applied to amplifier 50 from the output of a 9 millisecond one-shot delay multivibrator 58 which is in turn connected in a chain of single-shot delay multivibrators 60, 62 and 64 which respectively provide 200, 700 and 100 microsecond delay pulses. The output of the 100 microsecond delay multivibrator 64 is returned to trigger the 9 millisecond delay multivibrator 58.

Figure 4:
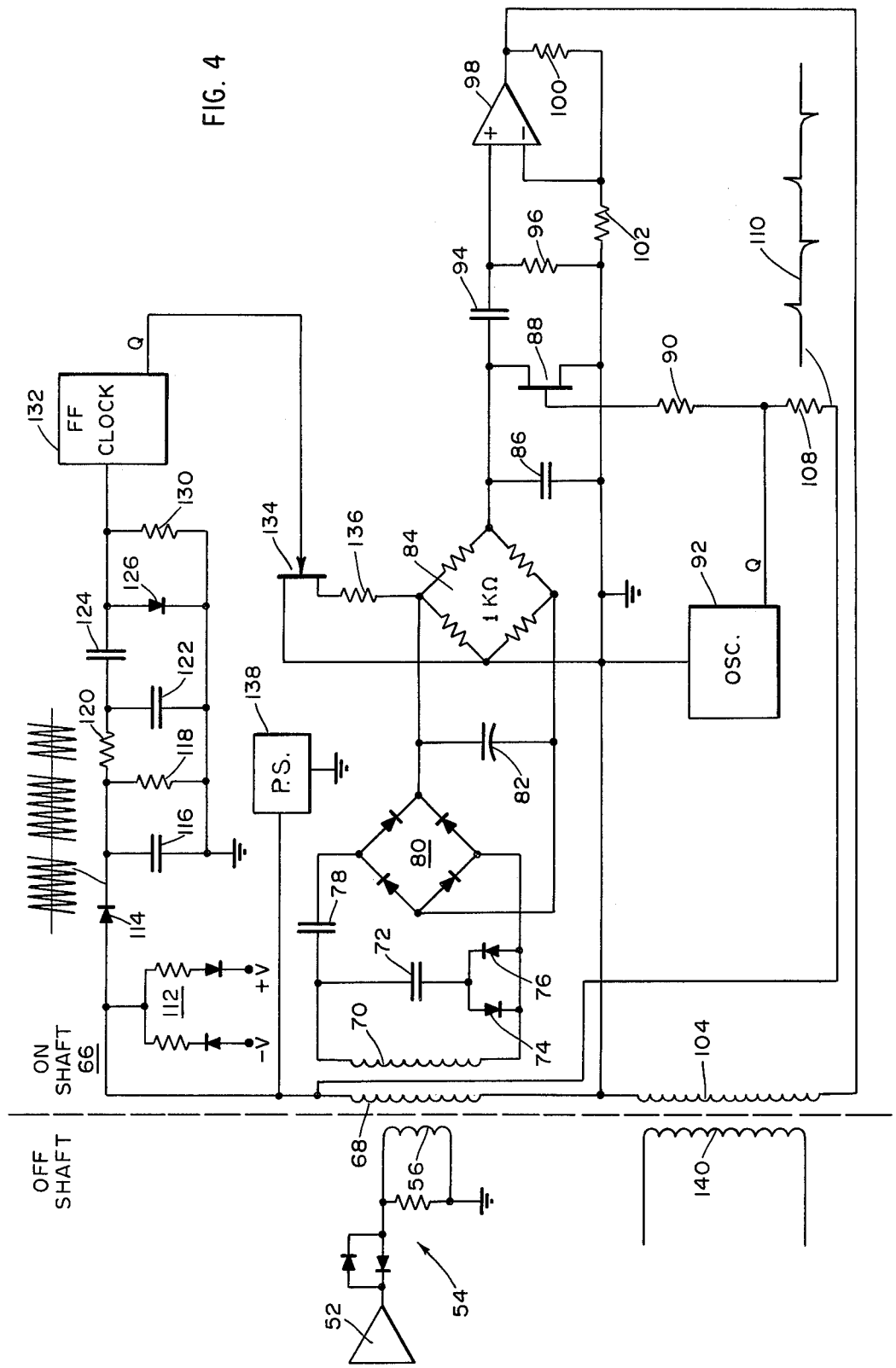
FIG. 4 is a detailed circuit diagram of circuitry according to the present invention located on a relatively moving element for sensing a parameter there.

With reference now to FIG. 4, the circuit diagram for the rotating circuitry 66 mounted on the relatively moving element, in this case a rotating shaft, is more fully described. As shown there, the rotary transformer has first and second secondary coils 68 and 70. The secondary coil 70 has a capacitor 72 in series with amplitude limiting diodes 74 and 76 connected across its terminals for purposes of rapidly damping the power signal at 50 KHz during the 1 millisecond dead time of no signal. The signal from the coil 70 is applied through a capacitor 78 to a diode rectification bridge 80. The rectified output of the bridge 80 is applied across a filter capacitor 82 for storing a DC signal during the 1 millisecond dead time which in turn energizes a strain gage bridge 84 composed of a diamond-shaped array of strain gage sensors applied to the surface of the rotating shaft, each sensor typically having a 1 kilohm impedance. The output of the bridge 84 upon diagonally opposite terminals, different from the input terminals is applied across a filter capacitor 86 having one side connected to shaft circuit common as distinct from shaft ground. An FET transistor 88 has its source and drain terminals connected across the capacitor 86, and its gate connected through a resistance 90 to the Q output of a free-running 10 KHz oscillator 92. In this manner, the strain gage bridge output signal, essentially DC, is chopped at 10 KHz. This signal is AC coupled through a capacitor 94 to a load resistor 96 and into a noninverting input of a differential amplifier 98. The inverting input of amplifier 98 is potentiometrically biased with feedback from the amplifier output through resistors 100 and 102. The output of the amplifier 98 is also applied through coil 104 of a rotary transformer.

The Q output of the oscillator 92 is applied through a resistor 108 to the high side of shaft-mounted coil 68 of the power rotary transformer. The RL combination of resistor 108 and coil 68 produces a pulse sequence as shown in waveform 110 for transmission back to coil 56 as will be discussed below. The high side of the transformer 68, receiving the 9 millisecond burst of 50

KHz power signal separated by 1 millisecond zero signal level periods is connected through an amplitude limiting circuit 112 and through a detector diode 114 to a filter circuit consisting of parallel shunt capacitor 116 and resistor 118 followed by series resistor 120 and shunt capacitor 122 to smooth the input signal into a series of pulses separated by the 10 millisecond cycle interval for the 50 KHz power signal. A series connected capacitor 124 and shunt diode 126 in parallel with a resistor 130 provide a DC level shift function for application of the 1 millisecond spaced pulses to the clock input of a D type flip-flop 132 arranged to provide a toggle of its state upon each pulse input. The Q output of the flip-flop 132 is applied to the gate of an FET transistor 134 to alternatively close and open circuit a shunt, including a resistor 136, across one leg of the strain gage bridge 84. The value of resistor 136 is selected preferably in relation to the value of the resistances in bridge 84 so that the shift in signal output of the bridge 84 when the shunt resistance 136 is connected into the strain gage bridge is approximately an order of magnitude greater than the full scale signal from the bridge 84. Modulus temperature compensation may be incorporated in resistor 136 through a thermistor network which causes the value of resistor to decrease as temperature goes up.

A component power supply 138 is connected across the coil 68 to provide operating power for shaft-mounted components such as the amplifier 98, oscillator 92, and flip-flop 132. Any conventional form of rectification and filtering, such as by a diode bridge and RC network, may be employed for power supply 138.

The signal applied to the transformer winding 104 is coupled to a similar stator winding 140, located off the shaft. With reference to FIG. 3, the signal for winding 140 is applied through a low-pass filter 144 to attenuate the 50 KHz signal and subsequently through an amplifier 146 to boost the signal level of the 10 KHz chopped signal for application to a chopper circuit 148 which responds to the 700 microsecond signal from delay multivibrator 62 to pass this signal from amplifier 146 only during the 700 microsecond sample interval. This output of chopper 148 is applied through a potentiometric resistive network comprising resistors 150 and 152 to the noninverting input of an amplifier 154. The output of amplifier 154 is potentiometrically attenuated through resistors 156 and 158 and applied through a resistor 160 to the inverting input of an amplifier 162. The output of amplifier 162 is fed back through a resistor 164 to the inverting input thereof. The inverting input of amplifier 154 and the noninverting input of amplifier 162 are biased to ground through respective resistors 166 and 168. The output of amplifier 154 is an in-phase reproduction of the output of chopper 148, while the output of amplifier 162 is a 180° out-of-phase reproduction of the output of chopper 148. These respective outputs are applied to phase and time controlled switches 170 and 172 respectively. The output of switches 170 and 172 are combined together for application to circuitry to be described below.

The controls for switches 170 and 172 are provided through respective buffer amplifiers 174 and 176 from respective inverting AND gates 178 and 180. One input for gates 178 and 180 is taken from the 700 microsecond sample signal. The other inputs of gates 178 and 180 are provided respectively from R-S configured amplifiers 188 and 190. Amplifier 188 receives on its noninverting input the signal from the high side of coil 56 which, during the 700 microsecond sample interval is the pulse sequence of waveform 110. The output of amplifier 188 is applied to the inverting input of amplifier 190 and the output of amplifier 188. The noninverting input of amplifier 190 is grounded. The outputs of amplifiers 188 and 190 are 180° out of phase with respect to each other and synchronized to the 10 KHz pulses in waveform 110. Accordingly, the gates 178 and 180 provide, during the 700 microsecond sample interval, 180° out-of-phase controls for the switches 170 and 172, with the result that the summed output from the switches represents a full wave, synchronous demodulation of the modulated 10 KHz signal during the 700 microsecond sample interval. Phase adjustment of the 10 KHz signal for proper synchronous detection may be provided by an adjustment of filter 144 values.

The demodulated signal is applied through resistances 192 and 194 to first and second control switches 196 and 198. This same synchronously detected signal is also applied to a voltage level comparator amplifier 200 having at least a 20 KHz response. The amplitude response is adjusted to provide an output in response to the amplitude which corresponds to the signal from the strain gage bridge during the time when FET 134 is close circuited, and the bridge output is approximately 10 times full scale torque signal, the torque pulse reference signal. The signal corresponding to recognition of this signal by comparator 200 is applied through a negative level protection diode 202 to the clock input of a D flip-flop 204. A data input to the flip-flop 204 is provided from the delay multivibrator 62 to effectively enable flip-flop 204 during the 700 microsecond torque and torque plus reference sample periods only. AND gates 206 and 208 respond respectively to the Q and Q̄ outputs from flip-flop 204 gated by the output from a 50 microsecond delay multivibrator 210 which is triggered by the 700 microsecond sample interval and provides a short delay to eliminate the effect of settling and transients in the circuitry up to this point. The AND gates 206 and 208 will accordingly recognize the periods of reference plus torque signal transmission from the rotating shaft and periods of torque signal alone transmission from the rotating shaft. Their outputs are applied through logic buffers 212 and 214 to control the switches 198 and 196 respectively. Signals from switches 196 and 198 are applied through ultra-low pass filters 216 and 218 which preserve only the modulating signal level from the strain gage bridge, and are subsequently applied through unity gain buffer amplifiers 220 and 222 which include a storage capacitor output to preserve signal levels. A difference circuit 224 responds to the outputs of the amplifiers 220 and 222 to generate a signal representing their difference. This difference signal will correspond to the reference signal alone, the torque signal which was preserved with the reference signal having been cancelled in difference circuit 224. In the case where the reference signal is elected to be 10 times the full scale torque signal, an attenuator circuit 226 provides a factor of 10 attenuation in the reference signal from the difference circuit 224 such that its output represents full scale torque signal. The output of the attenuator 226 along with the output of buffer amplifier 220, representing the torque signal, may be applied to a ratio digital volt meter 228 to indicate a digital number which is the ratio of the actual torque signal to the full scale torque signal.

The ratioing digital volt meter 228 is triggered by the output of an inverting AND gate 230 which on one input receives the 100 microsecond output of delay multivibrator 64, and on a second input the output of a divide-by-thirty-two circuit 232, typically a binary counter. The digital divide-by-32 circuit 232 is triggered from AND gate 206 and is reset from the output of AND gate 230 through a 50 microsecond delay multivibrator 234. The function of the gate 230 is to trigger DVM 228 at the same point in the time cycle of the system to cancel out the effect of small ripple on the output of filters 216 and 218.

Preferably, a circuit is provided to eliminate any zero offset signal from the strain gage bridge by applying a signal to the torque and reference signals in proportion to the magnitude of the reference signal. For this purpose the torque and reference signals, before application to DVM 228, are summed in respective summers 240 and 241 with the signal from the wiper arm of a potentiometer 246. Potentiometer 246 is connected between the inverting input and output of an amplifier 244. A biasing resistor 242 connects the output of amplifier 244 to a noninverting input. The inverting input of amplifier 244 is connected to the output of attenuator 226. This circuit permits compensation of the zero offset to produce an output indication of torque which is zero at zero torque and negative for torque of one polarity and positive for torque of the other polarity.

Having described a preferred embodiment for the present invention, it will occur to those skilled in the art that alternatives and modifications to the disclosed circuitry may be employed with the spirit of the invention. It is accordingly intended to limit the scope of the invention only as indicated in the following claims.

What is claimed is:

1. A system for providing an indication of the magnitude of a parameter on a relatively moving element comprising:
   means for coupling power from a point external of said relatively moving element to said relatively moving element;
   a sensor for a parameter of said relatively moving element;
   means responsive to power coupled to said relatively moving element for energizing said sensor;
   said sensor having a sensor output signal representative of a parameter to which said sensor is responsive;
   means associated with said relatively moving element and operative for periodically providing a predetermined adjustment in a property of said sensor to provide a predetermined change in amplitude in said sensor output signal;
   means for coupling said output sensor signal from said relatively moving element to a point external thereof;
   means responsive to the coupled output sensor signal amplitude for providing a first signal representative of said output sensor signal when said adjusting means is not operative and for providing a second signal representative of said sensor output signal when said adjusting means is operative;
   means responsive to said first and second signals for providing an indication of the parameter being sensed by said sensor.

2. The system of claim 1 wherein said first and second mentioned coupling means include a rotary transformer.

3. The system of claim 1 wherein said means for energizing said sensor includes a rectifier and storage capacitor.

4. The system of claim 1 further including:
   means for generating the power for coupling to said relatively moving element as a signal having periodically provided portions of no signal; and
   means for providing rapid damping of the power signal in response to said portions of no power signal.

5. The system of claim 1 wherein:
   said relatively moving element includes a rotating shaft;
   said sensor includes a strain gage bridge applied to said rotating shaft for sensing torque.

6. The system of claim 1 wherein said adjusting means includes means for generally increasing the magnitude of said sensor output signal in response to the periodic operation thereof.

7. The system of claim 1 wherein said amplitude responsive means includes gating means for selectively applying the sensor output signal coupled from said relatively moving element along first and second paths as said first and second signals.

8. The system of claim 1 further including:
   means responsive to the sensor output signal coupled from said relatively moving element for providing a signal for application to said amplitude responsive means which has an amplitude representative of the magnitude of the parameter sensed by said sensor and a polarity representative of the polarity of the parameter sensed by said sensor.

9. The system of claim 8 wherein said means for providing a signal for application to said amplitude means includes a synchronous detector.

10. The system of claim 1 wherein said means for providing an indication of the parameter being sensed includes means for indicating the ratio of said first signal to the difference between said first and second signals.

11. The system of claim 1 wherein:
    means are provided for generating a signal from which power is coupled to said relatively moving element and providing that signal as an oscillation of a first frequency with periodic interruptions for portions of no signal;
    said adjusting means is responsive to said portions of no signal in the coupled power for shifting its operation between states of normal sensor output signal and sensor output signal having said changed amplitude.

12. The system of claim 11 further including:
    means for chopping the output signal of said sensor at a second frequency before coupling thereof to points external of said relatively moving element;
    said means for coupling to points external of said relatively moving element providing a signal with an indication of the phasing of said second oscillation frequency;
    means responsive to the coupled, chopped output sensor signal and the coupled signal representing phase of said second oscillation frequency for providing synchronous detection of said coupled, chopped output sensor signal.

13. The system of claim 11 further including means for inhibiting the provision of the indication of the parameter being sensed except during the portions of no signal in said power coupled to said relatively moving element.

14. The system of claim 1 wherein said adjusting means includes modulus temperature compensation.

15. The system of claim 1 further including means for compensating said indication for sensor zero offset.

16. The system of claim 1 further including:
means for providing periodic electrical markers in the power coupled to said relatively moving element; and
means responsive to said markers for making the periodic adjustment in said sensor property.

17. A system for providing an indication of the magnitude of a parameter on a relatively moving element comprising:
means for coupling power from a point external of said relatively moving element to said relatively moving element;
a sensor for a parameter on said relatively moving element;
means responsive to power coupled to said relatively moving element for energizing said sensor;
the energized sensor having a sensor output signal representative of a parameter to which said sensor is responsive;
means associated with said relatively moving element and periodically operative for adjusting a property of said sensor to provide a predetermined change in said sensor output signal;
means for coupling said sensor output signal from said relatively moving element to points external thereof;
phase sensitive means responsive to the coupled sensor output signal for providing a first signal representative of said output sensor signal magnitude and sign when said adjusting means is not operative and for providing a second signal representative of said sensor output signal magnitude and sign when said adjusting means is operative;
means responsive to said first and second signals for providing an indication of the parameter being sensed by said sensor.

18. The system of claim 17 wherein said first and second mentioned coupling means include a rotary transformer.

19. The system of claim 17 wherein said means for energizing said sensor includes a rectifier.

20. The system of claim 17 further including:
means for generating the power for coupling to said relatively moving element as a signal having periodically provided portions of no signal;
means for providing rapid damping of the power signal in response to said portions of no power signal.

21. The system of claim 17 wherein:
said relatively moving element includes a rotating shaft;
said sensor includes a strain gage bridge applied to said rotating shaft for sensing torque.

22. The system of claim 17 wherein said adjusting means includes means for generally increasing the magnitude of said sensor output signal in response to the periodic operation thereof.

23. The system of claim 17 wherein said first and second signal providing means include gating means for selectively applying the sensor output signal coupled from said relatively moving element along first and second paths as said first and second signals.

24. The system of claim 17 further including:
means responsive to the sensor output signal coupled from said relatively moving element for providing a signal for application to said first and second providing means which has an amplitude representative of the magnitude of the parameter sensed by said sensor and a phasing representative of the polarity of the parameter sensed by said sensor.

25. The system of claim 24 wherein said means for providing a signal for application to said amplitude responsive means includes a synchronous detector.

26. The system of claim 17 wherein said means for providing an indication of the parameter being sensed includes means for indicating the ratio of said first signal to the difference between said first and second signals.

27. The system of claim 17 wherein:
means are provided for generating a signal from which power is coupled to said relatively moving element and providing that signal as an oscillation of a first frequency with periodic interruptions for portions of no signal;
said adjusting means is responsive to said portions of no signal in the coupled power for shifting its operation between states of normal sensor output signal and sensor output signal having an increased amplitude.

28. The system of claim 27 further including:
means for chopping the output signal of said sensor at a second frequency before coupling thereof to points external said relatively moving element;
said means for coupling to points external of said relatively moving element providing a signal with an indication of the phasing of said second oscillation frequency;
means responsive to the coupled chopped sensor output signal and the coupled signal representing phase of said second oscillation frequency for providing synchronous detection of said coupled chopped sensor output signal.

29. The system of claim 27 further including means for inhibiting the provision of the indication of the parameter being sensed except during the portions of no signal in said power coupled to said relatively moving element.

30. The system of claim 17 wherein said adjusting means includes modulus temperature compensation.

31. The system of claim 17 further including means for compensating said indication for sensor zero offset.

32. The system of claim 17 further including:
means for providing periodic electrical markers in the power coupled to said relatively moving element; and
means responsive to said markers for making the periodic adjustment in said sensor property.

* * * * *